(12) United States Patent
Takeda

(10) Patent No.: US 11,807,300 B2
(45) Date of Patent: Nov. 7, 2023

(54) CROSS MEMBER STRUCTURE OF VEHICLE BODY

(71) Applicant: HONDA MOTOR CO., LTD., Tokyo (JP)

(72) Inventor: Tomoya Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 576 days.

(21) Appl. No.: 16/941,572

(22) Filed: Jul. 29, 2020

(65) Prior Publication Data

US 2021/0031834 A1 Feb. 4, 2021

(30) Foreign Application Priority Data

Aug. 1, 2019 (JP) .................................. 2019-142032

(51) Int. Cl.
*B62D 21/02* (2006.01)
*B60K 15/03* (2006.01)
(Continued)

(52) U.S. Cl.
CPC .............. *B62D 21/02* (2013.01); *B60K 15/03* (2013.01); *B62D 25/025* (2013.01); *B62D 25/2036* (2013.01)

(58) Field of Classification Search
CPC ...... B62D 21/02; B62D 25/025; B62D 21/15; B60Y 2306/01; B60K 15/03
See application file for complete search history.

(56) References Cited

U.S. PATENT DOCUMENTS 1,908,638 A * 5/1933 Maddock ............... B62D 21/02
280/800
4,514,008 A * 4/1985 Watanabe .......... B62D 25/2036
296/204
(Continued)

FOREIGN PATENT DOCUMENTS

CN 1935582 3/2007
CN 204871199 12/2015
(Continued)

OTHER PUBLICATIONS

Japanese Office Action for Japanese Patent Application No. 2019-142032 dated Jun. 22, 2021.
(Continued)

*Primary Examiner* — Phutthiwat Wongwian
*Assistant Examiner* — Arnold Castro
(74) *Attorney, Agent, or Firm* — AMIN, TUROCY & WATSON, LLP

(57) ABSTRACT

A cross member structure of a vehicle body includes a floor panel (2) provided below a vehicle interior in the vehicle body (10); side sills (3) that are provided on both sides of the floor panel (2) in a vehicle width direction and extend in a front-rear direction of the vehicle body (10); a cross member (4) that extends in the vehicle width direction and connects the side sills (3) to each other; and a reinforcement (5) that is provided between the cross member (4) and the floor panel (2) and extends in the vehicle width direction, wherein the cross member (4) includes a curved portion (41) that is curved to at least one side in a vertical direction of the vehicle body (10) outward from the reinforcement (5) in the vehicle width direction.

13 Claims, 5 Drawing Sheets

(51) Int. Cl.
*B62D 25/02* (2006.01)
*B62D 25/20* (2006.01)

(56) References Cited

U.S. PATENT DOCUMENTS

| | | | | |
|---|---|---|---|---|
| 5,848,469 | A * | 12/1998 | O'Connor | B21D 39/044 29/523 |
| 2006/0012162 | A1* | 1/2006 | Werner | B62D 21/02 280/781 |
| 2010/0200324 | A1* | 8/2010 | Melvin | B62D 21/11 180/312 |
| 2011/0198890 | A1* | 8/2011 | Peschansky | B21D 53/88 296/205 |
| 2012/0285764 | A1* | 11/2012 | Compton | B62D 21/02 180/312 |
| 2015/0108793 | A1* | 4/2015 | Peschansky | B62D 29/005 296/205 |
| 2017/0113541 | A1* | 4/2017 | Muramatsu | B60K 15/063 |
| 2019/0009661 | A1* | 1/2019 | Okamura | H01M 50/249 |
| 2021/0031834 | A1* | 2/2021 | Takeda | B62D 25/025 |

FOREIGN PATENT DOCUMENTS

| | | |
|---|---|---|
| CN | 109070948 | 12/2018 |
| CN | 109204484 | 1/2019 |
| JP | 08-133131 | 5/1996 |
| JP | 2000-272544 | 10/2000 |
| JP | 2005-170076 | 6/2005 |
| JP | 2017-226396 | 12/2017 |

OTHER PUBLICATIONS

Chinese Office Action for Chinese Patent Application No. 202010733772.1 dated May 30, 2022.

Chinese Office Action for Chinese Patent Application No. 202010733772.1 dated Nov. 23, 2022.

* cited by examiner

CROSS MEMBER STRUCTURE OF VEHICLE BODY

CROSS-REFERENCE TO RELATED APPLICATION

Priority is claimed on Japanese Patent Application No. 2019-142032, filed Aug. 1, 2019, the content of which is incorporated herein by reference.

BACKGROUND OF THE INVENTION

Field of the Invention

The present invention relates to a cross member structure of a vehicle body.

Description of Related Art

In the related art, a technology in which a cross member is installed between a left side sill and a right side sill of a vehicle body to improve the rigidity of the vehicle body with this cross member and to increase an energy absorption amount with respect to a load input from a lateral side of the vehicle body has been variously proposed.

For example, Patent Document 1 (Japanese Unexamined Patent Application, First Publication No. H8-133131) discloses a cross member structure including a floor panel that has a tunnel portion at a central portion in a vehicle width direction, cross members that are each installed between both side walls of the tunnel portion and left and right side sills, a seat supporting member that is provided on an upper surface of the cross member, and a projecting portion that is formed from an appropriate position between the seat supporting member and the tunnel portion to the tunnel portion and continuously connects the left and right cross members to each other. A curved portion in which the upper surface of the cross member and the projecting portion are curved to be continuously connected at appropriate positions is formed on the upper surface of the cross member.

According to the technology described in Patent Document 1, when a load is input from a lateral side of the vehicle body, the tunnel portion and the curved portion can be deformed first, so that a seat provided between the side sill and the tunnel portion can be prevented from being deformed.

SUMMARY OF THE INVENTION

However, in the technology described in Patent Document 1, since the cross member structure extends in a substantially straight line from the cross member to the side sill, in a case in which a load is input at a position offset from the cross member in a front-rear direction on a lateral side of the vehicle body, a load is input obliquely with respect to a longitudinal direction of the cross member. Therefore, the cross member may bend in a front-rear direction of the vehicle, and an energy absorption efficiency may decrease. Further, in a case in which the cross member does not absorb the load sufficiently, the load may be transmitted to components such as a fuel tank disposed inward from the vehicle body in a vehicle width direction.

Therefore, an object of the present invention is to provide a cross member structure of a vehicle body which effectively absorbs a load input to a lateral side of the vehicle body and thus can protect components.

A cross member structure of a vehicle body according to the present invention employ the following configurations.

(1) A cross member structure of a vehicle body (for example, a cross member structure 1 of a vehicle body in an embodiment) according to an aspect of the present invention includes a floor panel (for example, a floor panel 2 in the embodiment) provided below a vehicle interior in the vehicle body (for example, a vehicle body 10 in the embodiment); side sills (for example, side sills 3 in the embodiment) that are provided on both sides of the floor panel in a vehicle width direction and extend in a front-rear direction of the vehicle body; a cross member (for example, a cross member 4 in the embodiment) that extends in the vehicle width direction and connects the side sills to each other; and a reinforcement (for example, a reinforcement 5 in the embodiment) that is provided between the cross member and the floor panel and extends in the vehicle width direction, wherein the cross member includes a curved portion (for example, a curved portion 41 in the embodiment) that is curved to at least one side in a vertical direction of the vehicle body outward from the reinforcement in the vehicle width direction.

(2) In the aspect of the above-mentioned (1), the lowermost portion (for example, a lower surface 59 of a horizontal portion 58 in the embodiment) of the reinforcement may be disposed to be at the same height as a central portion of the cross member in the vertical direction.

(3) In the aspect of the above-mentioned (1) or (2), the reinforcement may be provided above the cross member, the curved portion may be curved to protrude upward, the cross member may include an extension portion (for example, an extension portion 43 in the embodiment) that is connected to the curved portion and extends outward from the curved portion in the vehicle width direction, and a main body portion (for example, a main body portion 42 in the embodiment) that is connected to the curved portion and extends inward from the curved portion in the vehicle width direction, and a lower surface of the extension portion (for example, a lower surface 18 of an extension portion in the embodiment) may be located at a position above a lower surface of the main body portion (for example, a lower surface 17 of a main body portion 42 in the embodiment).

(4) In the aspect of the above-mentioned (1) to (3), an attachment bracket (for example, an attachment bracket 21 in the embodiment) for attaching the reinforcement to the floor panel may be provided between the reinforcement and the side sill, and the height dimension of the attachment bracket in the vertical direction may be smaller than a height dimension of the reinforcement in the vertical direction.

(5) In the aspect of the above-mentioned (4), a fuel tank (for example, a fuel tank 11 in the embodiment) may be disposed on one side in the front-rear direction with respect to the cross member, and the length of one side edge portion (for example, a front side edge portion 23 in the embodiment) located on one side of the attachment bracket in the front-rear direction may be longer than the length of the other side edge portion (for example, a rear side edge portion 25 in the embodiment) located on the other side of the attachment bracket in the front-rear direction.

(6) In the aspect of the above-mentioned (1) to (5), the cross member may be connected to the side sill via a connecting bracket (for example, a connecting bracket 6 in the embodiment).

(7) In the aspect of the above-mentioned (1) to (6), a fuel tank may be disposed on one side in the front-rear direction with respect to the cross member, the curved portion may be provided with a plurality of beads (for example, beads 45 in the embodiment) which each extend in the vehicle width direction and which are aligned in the front-rear direction, and the length of the bead (for example, a first bead 31 or a fourth bead 34 in the embodiment) formed on one side in the front-rear direction may be shorter than the length of the bead (for example, a third bead 33 or a seventh bead 37 in the embodiment) formed on the other side in the front-rear direction.

According to the configuration of (1), the cross member has the curved portion outward from the reinforcement in the vehicle width direction.

Here, in the related art in which the cross member is formed in a straight line in the vehicle width direction, for example, in a case in which a load is input at a position offset from the cross member in the front-rear direction on a lateral side of the vehicle body, a load is input obliquely with respect to a longitudinal direction of the cross member (the vehicle width direction), and thus the cross member may be deformed. Therefore, in the related art, a load input from a lateral side cannot be sufficiently absorbed by the cross member, and thus the load may be transmitted to components such as the fuel tank and a battery which are disposed in a center in the vehicle width direction.

According to the cross member structure of the vehicle body of the present aspect, since the cross member has the curved portion, in a case in which a load is input at a position offset from the cross member in the front-rear direction on a lateral side of the vehicle body, the curved portion is deformed first. At this time, the curved portion is gradually deformed from a side where the load is input toward a side opposite thereto. Accordingly, a load that is obliquely input to the cross member is absorbed by the curved portion, and thus a direction of the load that is input to the cross member can be aligned with the longitudinal direction of the cross member. Therefore, the cross member is prevented from being deformed in the front-rear direction, and thus the components disposed near the cross member can be protected. In addition, since a large stroke amount at the time of deformation outward from the reinforcement in the vehicle width direction can be secured, the load can be effectively absorbed.

Therefore, it is possible to provide a cross member structure of a vehicle body which effectively absorbs a load input to a lateral side of the vehicle body and thus can protect components.

According to the configuration of (2), the lowermost portion of the reinforcement is disposed to be at the same height as a central portion of the cross member in the vertical direction. Accordingly, a load input from a lateral side of the vehicle body can be transmitted to a central portion of the cross member. Therefore, a moment acting on the cross member in the vertical direction is reduced, and thus the rigidity of the cross member can be increased.

According to the configuration of (3), the cross member includes the extension portion provided outward from the curved portion in the vehicle width direction, and the main body portion provided inward from the curved portion in the vehicle width direction, and the lower surface of the extension portion is located at a position above the lower surface of the main body portion. Accordingly, when a load is applied to the cross member from a lateral side of the vehicle body, a height of the extension portion is maintained to be the same as a height of a central portion of the cross member in the vertical direction. Therefore, the cross member is deformed such that generation of a moment in the vertical direction is curbed, and thus the cross member can effectively absorb the load.

According to the configuration of (4), a height dimension of the attachment bracket in the vertical direction is smaller than a height dimension of the reinforcement in the vertical direction. Therefore, the rigidity of the attachment bracket is lower than the rigidity of the reinforcement. In addition, the attachment bracket is provided between the reinforcement and the side sill. Accordingly, when the load is input from a lateral side of the vehicle body, the attachment bracket is deformed first to absorb the load. Therefore, a load transmitted to the reinforcement can be reduced in comparison to a case in which a load is directly transmitted from the side sill to the reinforcement without using an attachment bracket.

According to the configuration of (5), since the length of one side edge portion of the attachment bracket is longer than the length of the other side edge portion of the attachment bracket, the rigidity of the one side edge portion of the attachment bracket can be increased as compared with the other side edge portion of the attachment bracket. Further, since the fuel tank is disposed on one side in the front-rear direction with respect to the attachment bracket, for example, in a case in which a load is input from a lateral side of the vehicle body, the rigidity of the one side edge portion on the one side on which the fuel tank is disposed is high, and thus transmission of the load to the fuel tank can be curbed. Therefore, the fuel tank can be protected against a load input from a lateral side of the vehicle body.

According to the configuration of (6), since the cross member is connected to the side sill via the connecting bracket, in a case in which the load is input to a lateral side of the vehicle body, the connecting bracket is deformed before the cross member is deformed. Accordingly, in a case in which the load is input at a position offset from the cross member in the front-rear direction on a lateral side of the vehicle body, a load that is obliquely input to the cross member is absorbed by the connecting bracket, and thus a direction of the load that is input to the cross member can be aligned with the longitudinal direction of the cross member. Therefore, a portion of the cross member inward from the curved portion in the vehicle width direction can be prevented from being deformed in the front-rear direction.

According to the configuration of (7), the curved portion is provided with a plurality of beads which each extend in the vehicle width direction and which are aligned in the front-rear direction, and the length of a bead formed on one side in the front-rear direction is shorter than the length of a bead formed on the other side in the front-rear direction. Therefore, particularly the one side portion of the curved portion in the front-rear direction is more likely to be deformed. In addition, the fuel tank is disposed on one side in the front-rear direction with respect to the cross member. Accordingly, for example, in a case in which the load is input to a position corresponding to the fuel tank on a lateral side of the vehicle body, the curved portion is gradually deformed from the one side on which the fuel tank is disposed. Accordingly, the load that is obliquely input to the cross member is absorbed by the curved portion, and thus a direction of the load that is input to the cross member can be aligned with the longitudinal direction of the cross member. Therefore, the cross member is prevented from being deformed in the front-rear direction, and thus the components such as the fuel tank disposed inward from the curved portion in the vehicle width direction can be protected.

DETAILED DESCRIPTION OF THE INVENTION

Hereinafter, an embodiment of the present invention will be described with reference to the drawings.
(Embodiment)
(Cross Member Structure of Vehicle Body)

Figure 1:
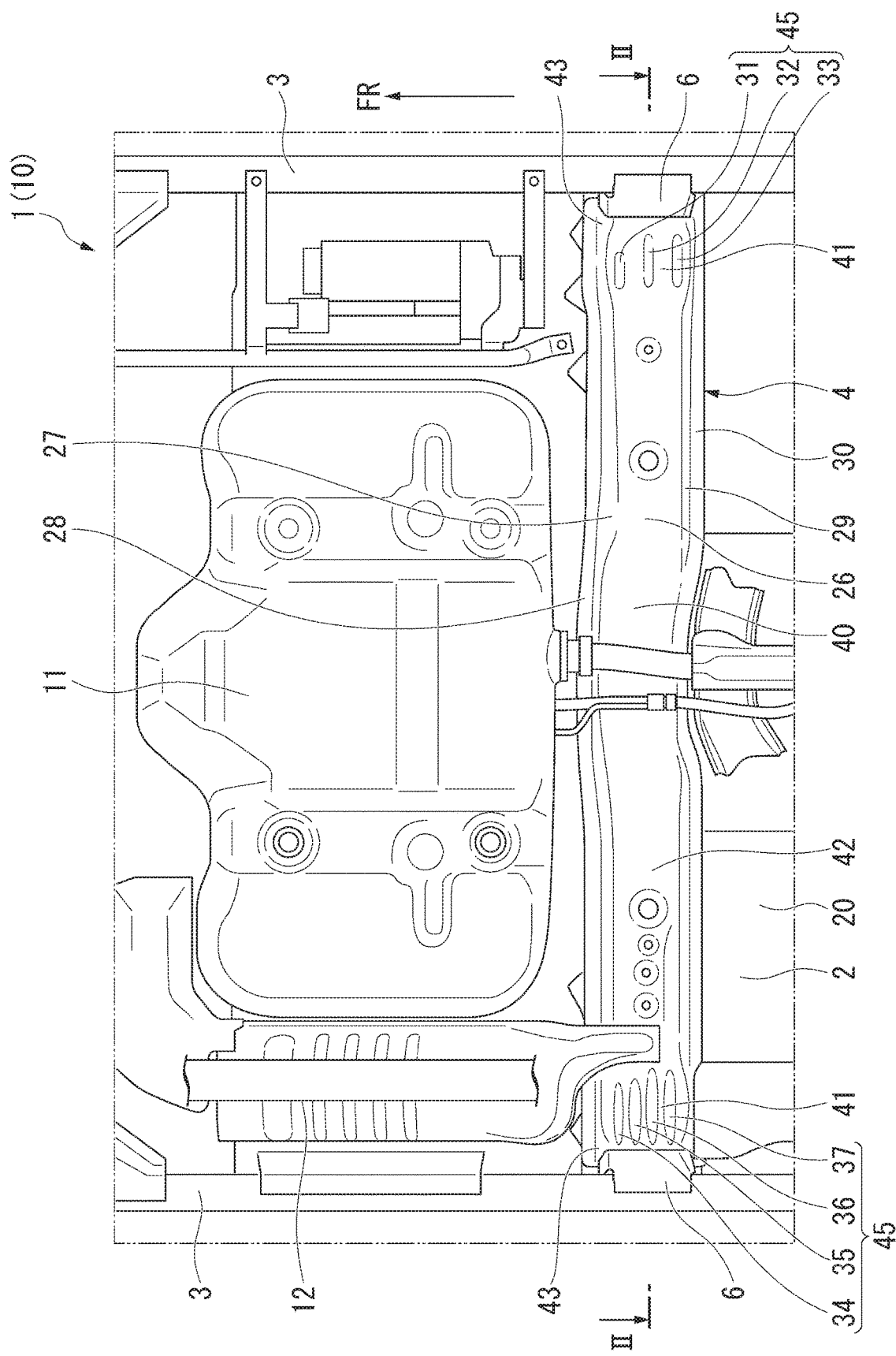
FIG. 1 is a bottom view of a vehicle body having a cross member structure according to an embodiment.
Figure 2:
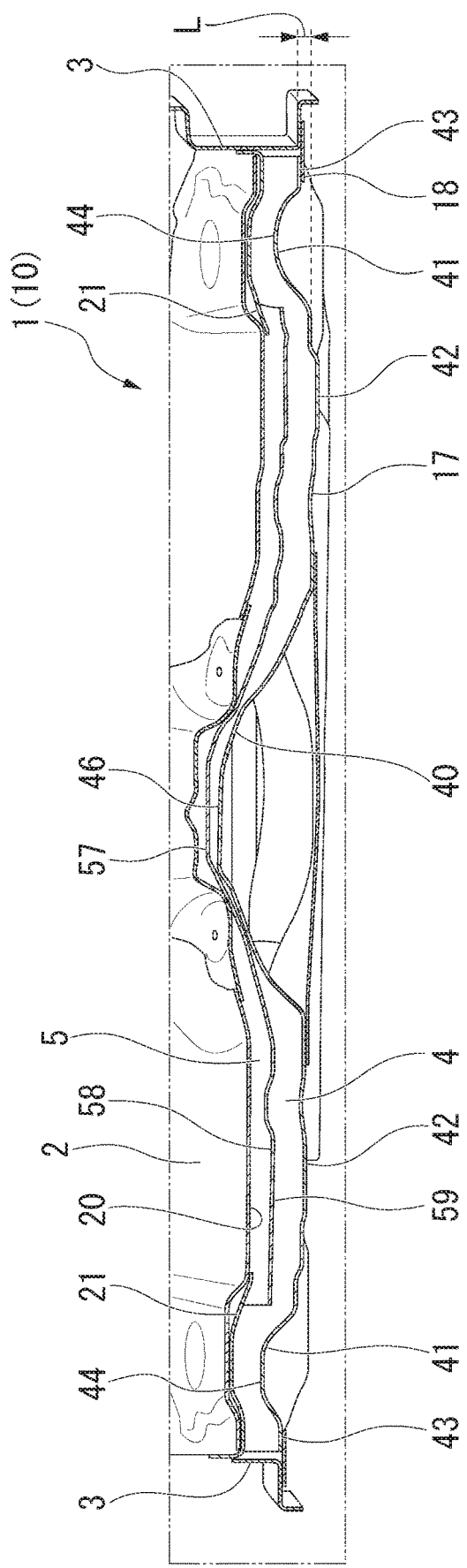
FIG. 2 is a cross sectional view along line II-II in FIG. 1.

FIG. 1 is a bottom view of a vehicle body 10 having a cross member structure 1 according to an embodiment. FIG. 2 is a cross sectional view along line II-II in FIG. 1.

The cross member structure 1 of the vehicle body 10 (hereinafter, simply referred to as the cross member structure 1) includes a floor panel 2, side sills 3, a cross member 4, and a reinforcement 5. In the following description, a front-rear direction, a left-right direction (a vehicle width direction), and a vertical direction each correspond to a front-rear direction, a left-right direction, and a vertical direction of the vehicle body 10.

The floor panel 2 is provided below a vehicle interior in the vehicle body 10.

The side sills 3 are provided on both sides of the floor panel 2 in the vehicle width direction. The side sills 3 extend in the front-rear direction of the vehicle body 10.
(Cross Member)

The cross member 4 is disposed below the floor panel 2. The cross member 4 extends in the vehicle width direction between left and right side sills 3. Both end portions of the cross member 4 in the vehicle width direction are each connected to the left and right side sills 3 via connecting brackets 6. The cross member 4 is formed in a hat shape whose cross sectional shape orthogonal to the vehicle width direction opens upward. Specifically, the cross member 4 includes a first lower surface 26 extending in the vehicle width direction, a first front surface 27 extending upward from a front end portion of the first lower surface 26, a first front flange 28 extending forward from an upper end portion of the first front surface 27, a first rear surface 29 extending upward from a rear end portion of the first lower surface 26, and a first rear flange 30 extending rearward from an upper end portion of the first rear surface 29. The first front flange 28 and the first rear flange 30 are attached to a lower surface 20 of the floor panel 2. Accordingly, when viewed in the vehicle width direction, the cross member 4 and the floor panel 2 form a closed cross section. Further, the cross member 4 has a projecting portion 40, a curved portion 41, a main body portion 42, and an extension portion 43.

As shown in FIG. 2, the projecting portion 40 projects to be convex upward at a central portion in the vehicle width direction when viewed in the front-rear direction. The projecting portion 40 is provided at a position corresponding to a floor tunnel (not shown) extending in the front-rear direction in a central portion of the vehicle body 10 in the vehicle width direction.

A pair of the curved portions 41 are provided on left and right sides outward from the projecting portion 40 in the vehicle width direction at an interval from the projecting portion 40. The curved portion 41 is curved to protrude upward. The radius of curvature of the curved portion 41 is smaller than a radius of curvature of the projecting portion 40. A top portion 44 of the curved portion 41 is located at a lower position than a top portion 46 of the projecting portion 40.

As shown in FIG. 1, the curved portion 41 is provided with beads 45 which each extend in the vehicle width direction. A plurality of the beads 45 are provided to be aligned in the front-rear direction. Specifically, the curved portion 41 provided on the left side (the right side in FIG. 1) in the vehicle width direction includes a first bead 31 (a bead formed on one side in the front-rear direction in the claims), a second bead 32 provided behind the first bead 31, and a third bead 33 provided behind the second bead 32 (a bead formed on the other side in the front-rear direction in the claims). The length of the first bead 31 in the vehicle width direction is shorter than the length of the second bead 32 in the vehicle width direction. The length of the second bead 32 in the vehicle width direction is equal to the length of the third bead 33 in the vehicle width direction.

The curved portion 41 provided on the right side (the left side in FIG. 1) in the vehicle width direction includes a fourth bead 34 (a bead formed on one side in the front-rear direction in the claims), a fifth bead 35 provided behind the fourth bead 34, a sixth bead 36 provided behind the fifth bead 35, and a seventh bead 37 provided behind the sixth bead 36 (a bead formed on the other side in the front-rear direction in the claims). The length of the fourth bead 34 in the vehicle width direction is equal to the length of the fifth bead 35 in the vehicle width direction. The length of the fifth bead 35 in the vehicle width direction is shorter than the length of the sixth bead 36 in the vehicle width direction. The length of the sixth bead 36 in the vehicle width direction is equal to the length of the seventh bead 37 in the vehicle width direction.

Note that the first bead 31, the second bead 32 and the third bead 33 may be provided on the right side of the vehicle body 10, and the fourth bead 34, the fifth bead 35, the sixth bead 36 and the seventh bead 37 may be provided on the left side of the vehicle body 10.

As shown in FIG. 2, the main body portion 42 connects the projecting portion 40 and each of the pair of curved portions 41 to each other. In other words, the main body portion 42 extends inward from the curved portion 41 in the vehicle width direction. An inward end portion of the main body portion 42 in the vehicle width direction is connected to an outward end portion of the projecting portion 40 in the vehicle width direction. A pair of the main body portions 42 are provided on the left and right sides. A lower surface 17 of the main body portion 42 extends substantially horizontally.

The extension portion 43 extends outward from the curved portion 41 in the vehicle width direction. A pair of extension portions 43 are provided on the left and right sides. A lower surface 18 of the extension portion 43 extends substantially horizontally. Here, the lower surface 18 of the extension portion 43 is located at a position above the lower surface 17 of the main body portion 42 by a length L.

In front of the cross member 4, a fuel tank 11 and an exhaust pipe 12 (both of which are shown in FIG. 1) are disposed at a predetermined interval from the cross member 4. The fuel tank 11 is disposed at a central portion in the vehicle width direction. The exhaust pipe 12 is disposed on a right side of the fuel tank 11 in the vehicle width direction.
(Reinforcement)

Figure 3:
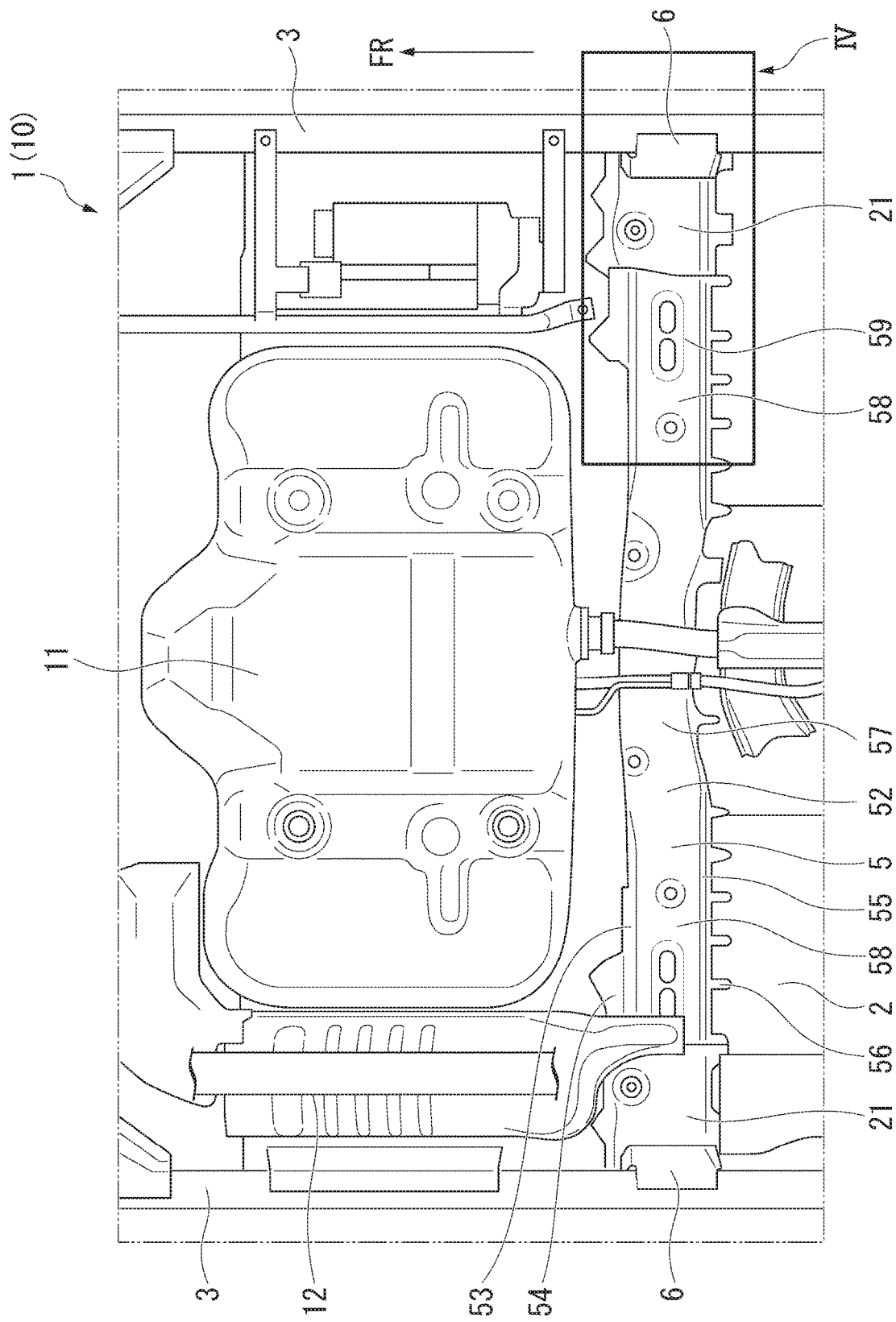
FIG. 3 is a bottom view of the vehicle body from which the cross member of FIG. 1 is omitted.

FIG. 3 is a bottom view of the vehicle body 10 from which the cross member 4 of FIG. 1 is omitted.

The reinforcement 5 is provided between the cross member 4 and the floor panel 2 (refer to also FIG. 2) in the vertical direction. The reinforcement 5 is provided at a position overlapping the cross member 4 in the front-rear direction. The reinforcement 5 extends in the vehicle width direction. The length of the reinforcement 5 in the vehicle width direction is shorter than the length of the cross member 4 in the vehicle width direction. Specifically, the reinforcement 5 is provided inward from the pair of curved portions 41 of the cross member 4 in the vehicle width direction.

The reinforcement 5 is formed in a hat shape whose cross sectional shape orthogonal to the vehicle width direction opens upward. Specifically, the reinforcement 5 includes a second lower surface 52 extending in the vehicle width direction, a second front surface 53 extending upward from a front end portion of the second lower surface 52, a second front flange 54 extending forward from an upper end portion of the second front surface 53, a second rear surface 55 extending upward from a rear end portion of the second lower surface 52, and a second rear flange 56 extending rearward from an upper end portion of the second rear surface 55. The second front flange 54 and the second rear flange 56 are attached to a lower surface 20 of the floor panel 2. Accordingly, when viewed in the vehicle width direction, the reinforcement 5 and the floor panel 2 form a closed cross section. Further, the reinforcement 5 has a protruding portion 57 and a horizontal portion 58.

As shown in FIG. 2, the protruding portion 57 protrudes to be convex upward at a central portion in the vehicle width direction when viewed in the front-rear direction. The protruding portion 57 is provided at a position corresponding to the projecting portion 40 of the cross member 4.

A pair of the horizontal portions 58 are provided at both ends of the protruding portion 57 in the vehicle width direction. The pair of horizontal portions 58 extend outward from the protruding portion 57 in the vehicle width direction. A lower surface 59 (the lowermost portion in the claims) of the horizontal portion 58 extends substantially horizontally. The lower surface 59 of the horizontal portion 58 is disposed to be at the same height as a central portion of the cross member 4 in the vertical direction.

Figure 4:
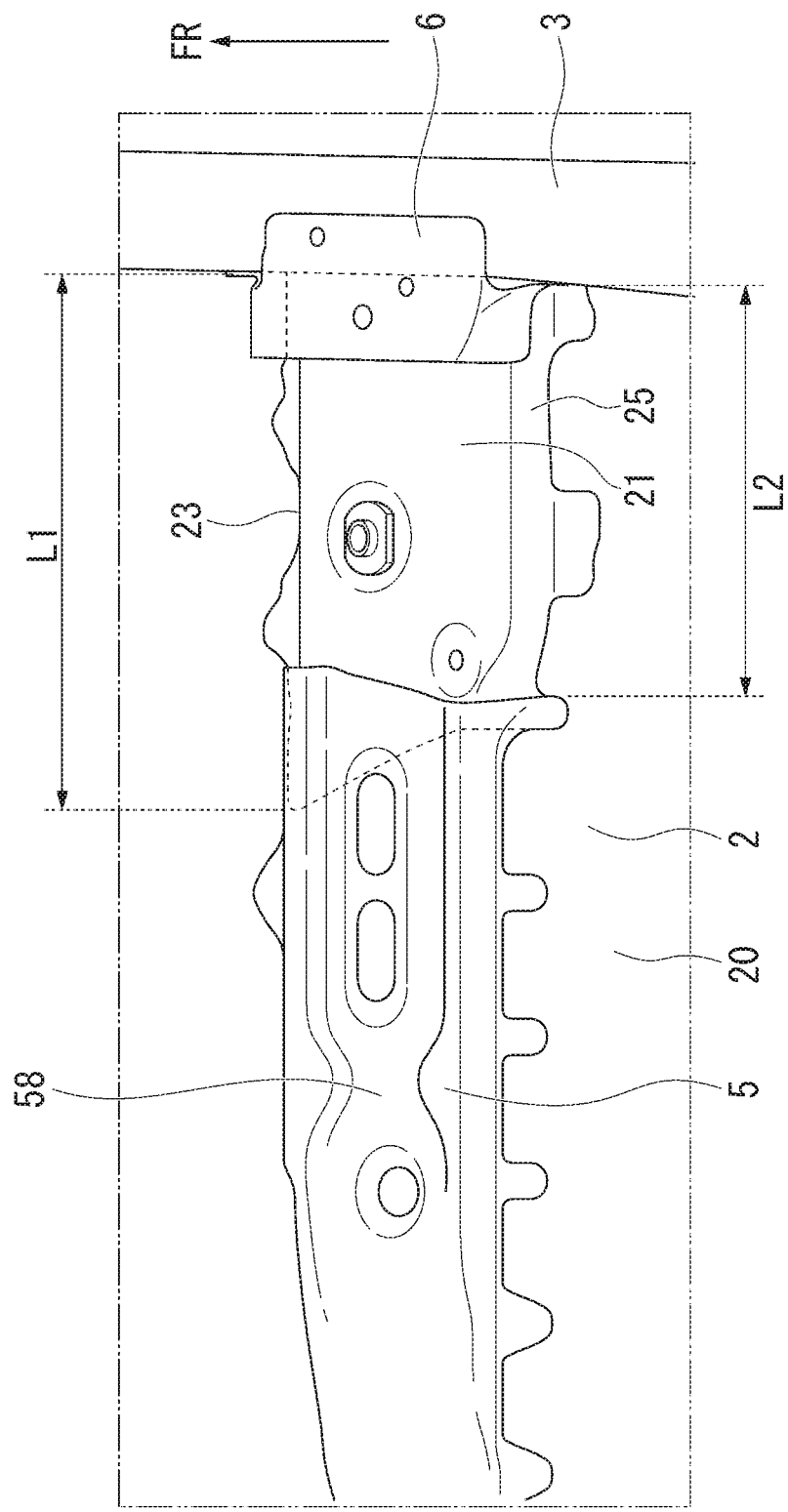
FIG. 4 is a perspective view showing an end portion of the reinforcement according to the embodiment.

FIG. 4 is a perspective view showing an end portion of the reinforcement 5 according to the embodiment, and is an enlarged perspective view of a IV portion in FIG. 3.

An attachment bracket 21 is connected to each of both end portions of the reinforcement 5 in the vehicle width direction. The attachment bracket 21 is provided between the reinforcement 5 and the side sill 3. The attachment bracket 21 is fixed to the lower surface 20 of the floor panel 2. Accordingly, the reinforcement 5 is attached to the floor panel 2 via the attachment bracket 21. A height dimension of the attachment bracket 21 in the vertical direction is smaller than a height dimension of the horizontal portion 58 of the reinforcement 5 in the vertical direction. Further, a length L1 in the vehicle width direction of a front side edge portion 23 (one side edge portion in the claims) located on a front side of the attachment bracket 21 is longer than a length L2 in the vehicle width direction of a rear side edge portion 25 (the other side edge portion in the claims) located on a rear side of the attachment bracket 21.

(Operation)

Next, an operation when a load is input from a lateral side of the vehicle body 10 having the above-described cross member structure 1 will be described.

Figure 5:
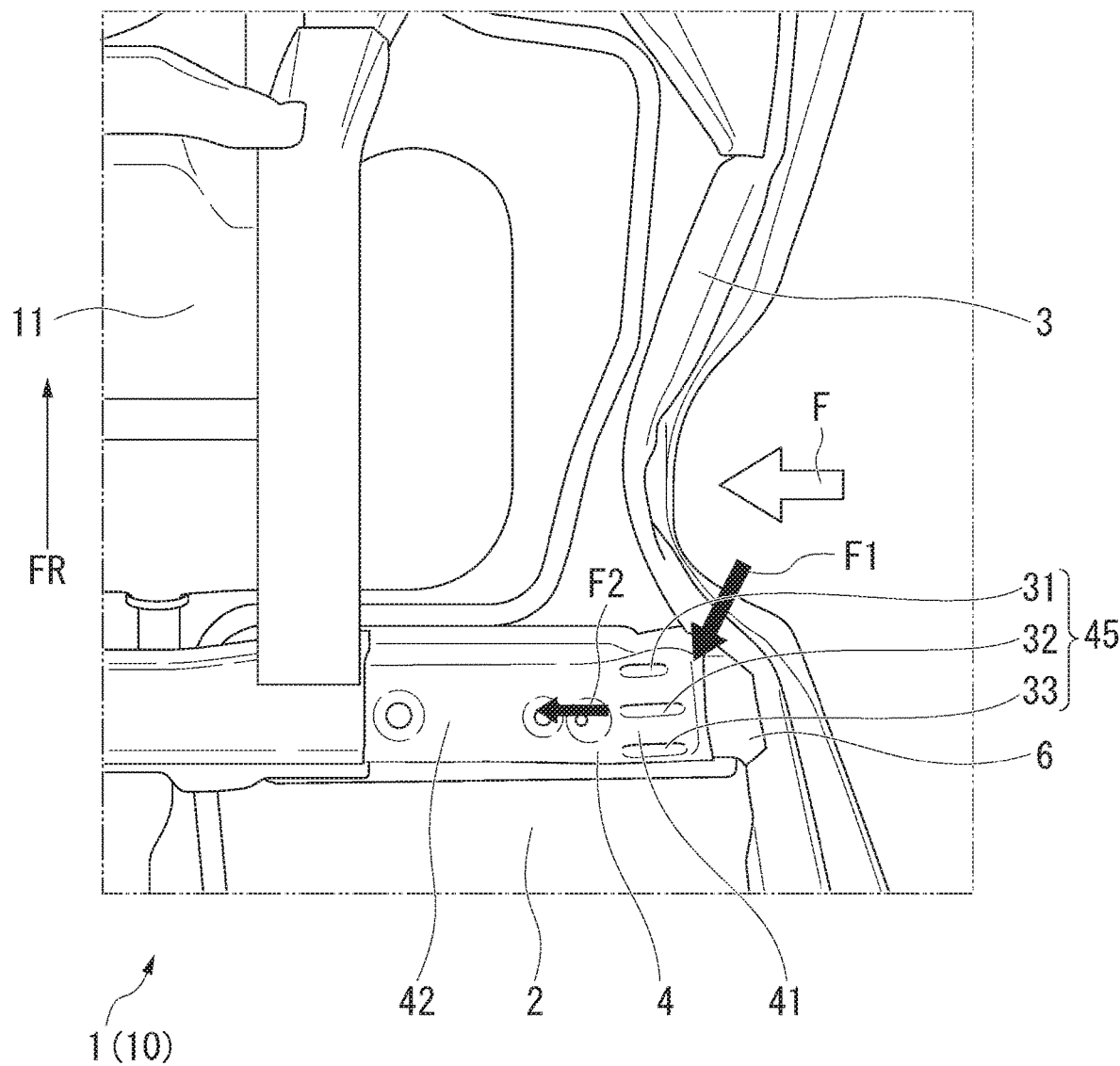
FIG. 5 is an explanatory view showing a deformed state of the vehicle body when a load is input from a lateral side of the vehicle body.

FIG. 5 is an explanatory view showing a deformed state of the vehicle body 10 when a load is input from a lateral side of the vehicle body 10.

As shown in FIG. 5, for example, if a load F is input to a position which is offset forward from the cross member 4 on a lateral side of the vehicle body 10 and faces the fuel tank 11, first, the side sill 3 and the floor panel 2 are deformed. Next, as the side sill 3 and the floor panel 2 are deformed, a load F1 acts on the end portion of the cross member 4 connected to the side sill 3 obliquely from the front thereof. Due to the load F1 in an oblique direction, the connecting bracket 6 of the cross member 4 is deformed first. Here, the connecting bracket 6 transmits the load from the side sill 3 to the cross member 4 in the vehicle width direction, and functions as a weak portion that is relatively weakly formed with respect to the load in a direction intersecting the cross member 4 (that is, the front-rear direction). Therefore, the connecting bracket 6 is deformed to absorb the load in the front-rear direction and to transmit the load mainly in the vehicle width direction to the cross member 4.

Next, the curved portion 41 of the cross member 4 is deformed due to the load F1 transmitted to the curved portion 41 from the connecting bracket 6. At this time, since the front side bead 45 of the curved portion 41 is shorter than the rear side bead 45, the rigidity of a front side of the curved portion 41 is lower than that of a rear side of the curved portion 41. Therefore, the curved portion 41 is gradually deformed from the front side due to the input load F1 in the oblique direction. That is, like the above-described connecting bracket 6, the curved portion 41 also functions as a weak portion that is weakly formed with respect to the load in the front-rear direction. Accordingly, the curved portion 41 absorbs the load in the front-rear direction, converts the load F1 in the oblique direction into a load F2 in the vehicle width direction, and transmits the load F2 to the main body portion 42 of the cross member 4.

In this way, by the connecting bracket 6 and the curved portion 41 being deformed, the load F1 in the oblique direction input to the cross member 4 is converted into the load F2 in the vehicle width direction. Therefore, the deformation of the cross member 4 in the front-rear direction is curbed. Further, since the cross member 4 is formed to have high rigidity with respect to the load in the vehicle width direction, the cross member curbs transmission of the load F to components such as the fuel tank 11 disposed inward from the curved portion 41 in the vehicle width direction and thus can protect the components such as the fuel tank 11.

(Action and Effects)

Next, an action and effects of the above-described cross member structure 1 will be described.

According to the cross member structure 1 of the vehicle body 10 of the present embodiment, the cross member 4 has the curved portion 41 outward from the reinforcement 5 in the vehicle width direction.

Here, in the related art in which the cross member 4 is formed in a straight line in the vehicle width direction, for example, in a case in which the load F is input at a position offset from the cross member 4 in the front-rear direction on a lateral side of the vehicle body 10, the load is input obliquely with respect to a longitudinal direction of the cross member 4 (the vehicle width direction), and thus the cross member 4 may be deformed. Therefore, in the related art, a load input from a lateral side cannot be sufficiently absorbed by the cross member 4, and thus the load may be transmitted to components such as the fuel tank 11 and a battery which are disposed in a center in the vehicle width direction.

According to the cross member structure 1 of the vehicle body 10 of the present invention, since the cross member 4 has the curved portion 41, in a case in which a load is input at a position offset from the cross member 4 in the front-rear direction on a lateral side of the vehicle body 10, the curved portion 41 is deformed first. At this time, the curved portion 41 is gradually deformed from a side where the load is input toward a side opposite thereto. Accordingly, a load that is obliquely input to the cross member 4 is absorbed by the curved portion 41, and thus a direction of the load that is input to the cross member 4 can be aligned with the longitudinal direction of the cross member 4. Therefore, the cross member 4 is prevented from being deformed in the front-rear direction, and thus the components disposed near the cross member 4 can be protected. In addition, since a large stroke amount at the time of deformation outward from the reinforcement 5 in the vehicle width direction can be secured, the load can be effectively absorbed.

Therefore, it is possible to provide the cross member structure 1 of the vehicle body 10 which effectively absorbs a load input to a lateral side of the vehicle body 10 and thus can protect components.

The lower surface 59 of the horizontal portion 58 of the reinforcement 5 is disposed to be at the same height as a central portion of the cross member 4 in the vertical direction. Accordingly, a load input from a lateral side of the vehicle body 10 can be transmitted at a central portion of the cross member 4. Therefore, a moment acting on the cross member 4 in the vertical direction is reduced, and thus the rigidity of the cross member 4 can be increased.

The cross member 4 includes the extension portion 43 provided outward from the curved portion 41 in the vehicle width direction, and the main body portion 42 provided inward from the curved portion 41 in the vehicle width direction, and the lower surface 18 of the extension portion 43 is located at a position above the lower surface 17 of the main body portion 42. Accordingly, when a load is applied to the cross member 4 from a lateral side of the vehicle body 10, a height of the extension portion 43 is maintained to be the same as a height of a central portion of the cross member 4 in the vertical direction. Therefore, the cross member 4 is deformed such that generation of a moment in the vertical direction is curbed, and thus the cross member 4 can effectively absorb the load.

A height dimension of the attachment bracket 21 in the vertical direction is smaller than a height dimension of the reinforcement 5 in the vertical direction. Therefore, the rigidity of the attachment bracket 21 is lower than the rigidity of the reinforcement 5. In addition, the attachment bracket 21 is provided between the reinforcement 5 and the side sill 3. Accordingly, when the load F is input from a lateral side of the vehicle body 10, the attachment bracket 21 is deformed first to absorb the load F. Therefore, the load F transmitted to the reinforcement 5 can be reduced in comparison to a case in which the load F is directly transmitted from the side sill 3 to the reinforcement 5 without using an attachment bracket 21.

Since the length of the front side edge portion 23 of the attachment bracket 21 is longer than the length of the rear side edge portion 25 of the attachment bracket, the rigidity of the front side edge portion 23 of the attachment bracket can be increased as compared with the rear side edge portion 25 of the attachment bracket 21. Further, since the fuel tank 11 is disposed in front of the attachment bracket 21, for example, in a case in which the load F is input from a lateral side of the vehicle body 10, the rigidity of the front side edge portion 23 in front of which the fuel tank 11 is disposed is high, and thus transmission of the load F to the fuel tank 11 can be curbed. Therefore, the fuel tank 11 can be protected against the load F input from a lateral side of the vehicle body 10.

Since the cross member 4 is connected to the side sill 3 via the connecting bracket 6, in a case in which the load F is input to a lateral side of the vehicle body 10, the connecting bracket 6 is deformed before the cross member 4 is deformed. Accordingly, in a case in which the load F is input at a position offset from the cross member 4 in the front-rear direction on a lateral side of the vehicle body 10, the load F1 that is obliquely input to the cross member 4 is absorbed by the connecting bracket 6, and thus a direction of the load that is input to the cross member 4 can be aligned with the longitudinal direction of the cross member 4. Therefore, a portion (the main body portion 42) of the cross member 4 inward from the curved portion 41 in the vehicle width direction can be prevented from being deformed in the front-rear direction.

The curved portion 41 is provided with the plurality of beads 45 which each extend in the vehicle width direction and which are aligned in the front-rear direction, and the length of each of the first bead 31 and the fourth bead 34 which are formed on the front side in the front-rear direction is shorter than the length of each of the third bead 33 and the seventh bead 37 which are formed on the rear side in the front-rear direction. Therefore, particularly the front side portion of the curved portion 41 in the front-rear direction is more likely to be deformed. In addition, the fuel tank 11 is disposed in front of the cross member 4. Accordingly, for example, in a case in which the load F is input to a position corresponding to the fuel tank 11 on a lateral side of the vehicle body 10, the curved portion 41 is gradually deformed from the front side in front of which the fuel tank 11 is disposed. Accordingly, the load F1 that is obliquely input to the cross member 4 is absorbed by the curved portion 41, and thus a direction of the load that is input to the cross member 4 can be aligned with the longitudinal direction of the cross member 4. Therefore, the cross member 4 is prevented from being deformed in the front-rear direction, and thus the components such as the fuel tank 11 disposed inward from the curved portion 41 in the vehicle width direction can be protected.

Note that the technical scope of the present invention is not limited to the above-described embodiment, and various modifications can be made without departing from the spirit of the present invention.

For example, in the above-described embodiment, the curved portion 41 is curved to be convex upward, but the present invention is not limited thereto. For example, the curved portion 41 may be curved to be convex downward. In addition, the curved portion 41 may be curved to be convex upward and downward alternately. Furthermore, the number of curved portions 41 is not limited to that in the above-described embodiment.

The number and shape of the beads 45 are not limited to those in the above-described embodiment.

In the vicinity of the cross member 4, components other than the fuel tank 11, such as a battery and an electric apparatus may be disposed.

While preferred embodiments of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Cross member structure of vehicle body
2 Floor panel
3 Side sill
4 Cross member
5 Reinforcement
6 Connecting bracket
10 Vehicle body
11 Fuel tank
17 Lower surface of main body portion
18 Lower surface of extension portion
21 Attachment bracket
23 Front side edge portion (one side edge portion)
25 Rear side edge portion (the other side edge portion)
31 First bead (bead formed on one side in front-rear direction)
33 Third bead (bead formed on the other side in front-rear direction)
34 Fourth bead (bead formed on one side in front-rear direction)
37 Seventh bead (bead formed on the other side in front-rear direction)
42 Main body portion
43 Extension portion
45 Bead
59 Lower surface of horizontal portion (the lowermost portion of reinforcement)

What is claimed is:

1. A cross member structure of a vehicle body, comprising:
a floor panel provided below a vehicle interior in the vehicle body;
side sills that are provided on both sides of the floor panel in a vehicle width direction and extend in a front-rear direction of the vehicle body;
a cross member that extends in the vehicle width direction and connects the side sills to each other; and
a reinforcement that is provided between the cross member and the floor panel and extends in the vehicle width direction,
wherein the cross member includes a curved portion that is curved to at least one side in a vertical direction of the vehicle body outward from the reinforcement in the vehicle width direction,
wherein the reinforcement is provided above the cross member,
wherein the curved portion is curved to protrude upward,
wherein the cross member includes
an extension portion that is connected to the curved portion and extends outward from the curved portion in the vehicle width direction, and
a main body portion that is connected to the curved portion and extends inward from the curved portion in the vehicle width direction, and
wherein a lower surface of the extension portion is located at a position above a lower surface of the main body portion.

2. The cross member structure of a vehicle body according to claim 1, wherein the lowermost portion of the reinforcement is disposed to be at the same height as a central portion of the cross member in the vertical direction.

3. The cross member structure of a vehicle body according to claim 1,
wherein a fuel tank is disposed on one side in the front-rear direction with respect to the cross member,
wherein the curved portion is provided with a plurality of beads which each extend in the vehicle width direction and which are aligned in the front-rear direction, and
wherein a length of the bead formed on one side in the front-rear direction is shorter than a length of the bead formed on the other side in the front-rear direction.

4. The cross member structure of a vehicle body according to claim 1,
wherein an attachment bracket for attaching the reinforcement to the floor panel is provided between the reinforcement and the side sill, and
wherein a height dimension of the attachment bracket in the vertical direction is smaller than a height dimension of the reinforcement in the vertical direction.

5. The cross member structure of a vehicle body according to claim 4,
wherein a fuel tank is disposed on one side in the front-rear direction with respect to the cross member, and
wherein a length of one side edge portion located on one side of the attachment bracket in the front-rear direction is longer than a length of the other side edge portion located on the other side of the attachment bracket in the front-rear direction.

6. The cross member structure of a vehicle body according to claim 1, wherein the cross member is connected to the side sill via a connecting bracket.

7. A cross member structure of a vehicle body, comprising:
a floor panel provided below a vehicle interior in the vehicle body;
side sills that are provided on both sides of the floor panel in a vehicle width direction and extend in a front-rear direction of the vehicle body;
a cross member that extends in the vehicle width direction and connects the side sills to each other; and
a reinforcement that is provided between the cross member and the floor panel and extends in the vehicle width direction,
wherein the cross member includes
a pair of curved portions that is curved to at least one side in a vertical direction of the vehicle body outward from the reinforcement in the vehicle width direction, and
a pair of main body portions that extends inward from the curved portion in the vehicle width direction,
wherein the reinforcement extends between the pair of main body portions, and
wherein the reinforcement overlaps in the vehicle width direction with an outer edge of the main body portion which is located outside of the vehicle width direction.

8. The cross member structure of a vehicle body according to claim 7,
wherein a fuel tank is disposed on one side in the front-rear direction with respect to the cross member,
wherein the curved portion is provided with a plurality of beads which each extend in the vehicle width direction and which are aligned in the front-rear direction, and
wherein a length of the bead formed on one side in the front-rear direction is shorter than a length of the bead formed on the other side in the front-rear direction.

9. The cross member structure of a vehicle body according to claim 7, wherein the lowermost portion of the reinforcement is disposed to be at the same height as a central portion of the cross member in the vertical direction.

10. The cross member structure of a vehicle body according to claim 7,
wherein the reinforcement is provided above the cross member,
wherein the curved portion is curved to protrude upward,
wherein the cross member includes
an extension portion that is connected to the curved portion and extends outward from the curved portion in the vehicle width direction, and
a main body portion that is connected to the curved portion and extends inward from the curved portion in the vehicle width direction, and
wherein a lower surface of the extension portion is located at a position above a lower surface of the main body portion.

11. The cross member structure of a vehicle body according to claim 7,
wherein an attachment bracket for attaching the reinforcement to the floor panel is provided between the reinforcement and the side sill, and
wherein a height dimension of the attachment bracket in the vertical direction is smaller than a height dimension of the reinforcement in the vertical direction.

12. The cross member structure of a vehicle body according to claim 11,
wherein a fuel tank is disposed on one side in the front-rear direction with respect to the cross member, and
wherein a length of one side edge portion located on one side of the attachment bracket in the front-rear direction is longer than a length of the other side edge portion located on the other side of the attachment bracket in the front-rear direction.

13. The cross member structure of a vehicle body according to claim 7, wherein the cross member is connected to the side sill via a connecting bracket.

* * * * *